United States Patent [19]

Kodama

[11] Patent Number: 5,742,867
[45] Date of Patent: Apr. 21, 1998

[54] IMAGE FORMING APPARATUS FOR CONTROLLING A SHEET CONVEYING SPEED ACCORDING TO A DETECTED IMAGE MISREGISTER IN A REFERENCE PATTERN

[75] Inventor: Hideaki Kodama, Okazaki, Japan

[73] Assignee: Minolta Co., Ltd., Osaka, Japan

[21] Appl. No.: 826,583

[22] Filed: Apr. 3, 1997

[30] Foreign Application Priority Data

Apr. 5, 1996 [JP] Japan .................. 8-083731

[51] Int. Cl.$^6$ .................................. G03G 15/00
[52] U.S. Cl. ........................ 399/49; 399/303; 399/396
[58] Field of Search .......................... 399/49, 45, 66, 399/301, 297, 388, 394, 395, 396, 303

[56] References Cited

U.S. PATENT DOCUMENTS

| | | | |
|---|---|---|---|
| 5,122,835 | 6/1992 | Rushing et al. | 399/49 |
| 5,175,585 | 12/1992 | Matsubayashi et al. | 399/49 |
| 5,311,215 | 5/1994 | Hattori et al. | |
| 5,383,014 | 1/1995 | Nowak et al. | 399/396 X |
| 5,404,202 | 4/1995 | Abramsohn | 399/395 X |

FOREIGN PATENT DOCUMENTS

| | | |
|---|---|---|
| 59-32792 | 8/1984 | Japan |
| 5-313509 | 11/1993 | Japan |

*Primary Examiner*—S. Lee
*Attorney, Agent, or Firm*—McDermott, Will & Emery

[57] ABSTRACT

An image forming apparatus which sequentially transfers and superimposes sequentially formed electrostatic latent images onto a sheet wound around a sheet support. The image forming apparatus have either a photoconductor where the electrostatic latent images are sequentially formed on the surface or a plurality of photoconductors where the electrostatic latent images are formed respectively and sequentially. The quantity of print dot misregister is detected by forming reference patterns on a sheet and by reading the formed reference patterns. The rotational speed of conveying rollers for delivering a sheet to the sheet support is switched over in response to the quantity of the print dot misregister. The rotational speed of the conveying rollers can also be switched over in response to the thickness of a sheet. In the case that the image forming apparatus is a full-color copying machine, the electrostatic latent images are of four types for cyan, magenta, yellow and black.

18 Claims, 11 Drawing Sheets

F I G. 1
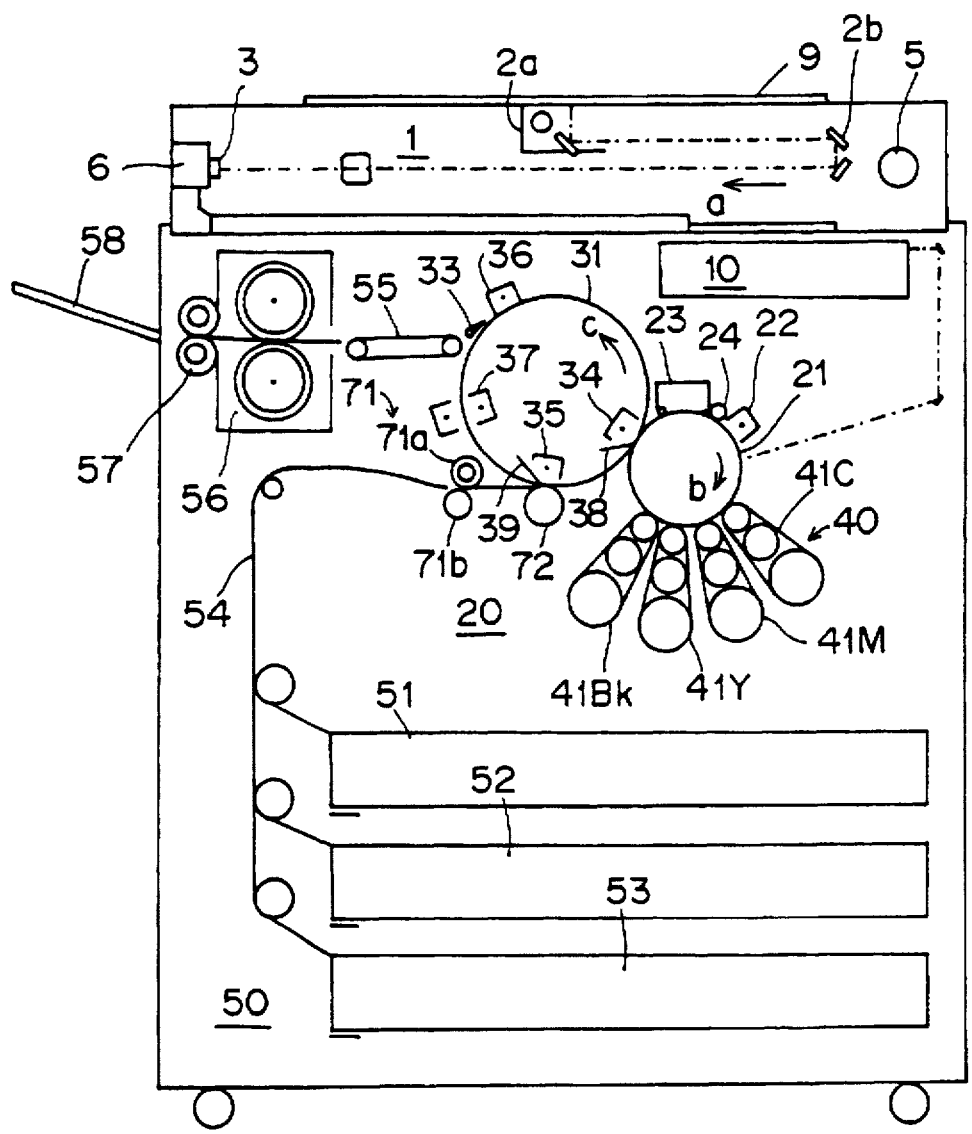

F I G. 6
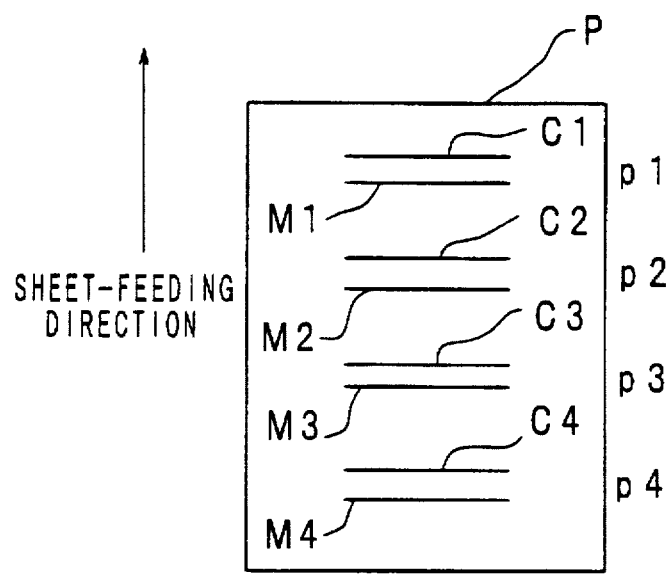

F I G. 1 2
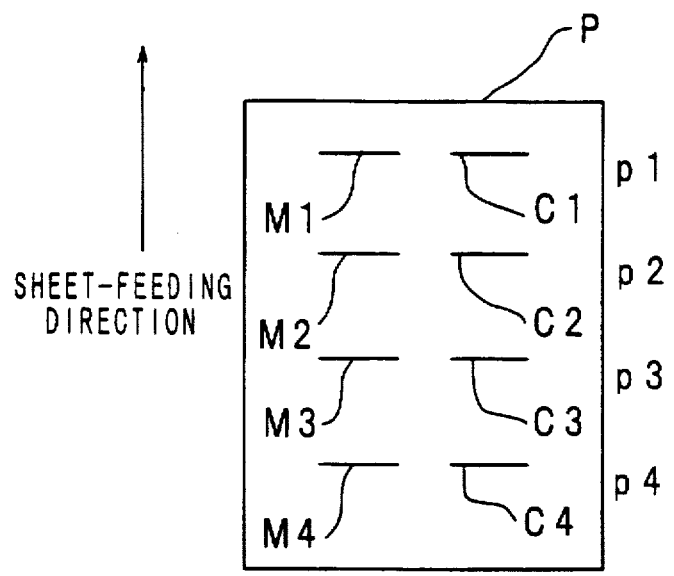

IMAGE FORMING APPARATUS FOR CONTROLLING A SHEET CONVEYING SPEED ACCORDING TO A DETECTED IMAGE MISREGISTER IN A REFERENCE PATTERN

BACKGROUND OF THE INVENTION

1. Field of the Invention

The present invention relates to an image forming apparatus and particularly to an image forming apparatus which sequentially transfers and superimposes a plurality of images formed sequentially onto a sheet wound around a sheet support.

2. Description of Related Art

An example of conventional image forming apparatus ever known is disclosed in Japanese Patent Publication No. 59-32792. The image forming apparatus transfers one color at a time onto a sheet placed on a transfer drum and repeats the transfer for different colors until all the colors are transferred onto the sheet. After the transfers are completed, the sheet is separated from the transfer drum, and a piece of color image is obtained on the sheet. Since this type of image forming apparatus sequentially transfers images having their respective colors onto a sheet and superimposes the images, any misregistration among the images has to be avoided. Therefore, in the image forming apparatus, the circumferences of the transfer drum and a photoconductor drum are set at an integral ratio so that the color misregister in the multiple transfer caused by the eccentricity of each of the drums and the like will be suppressed.

As disclosed in Japanese Patent Laid Open Publication NO. 5-318509, another type of image forming apparatus has been proposed in which the press-contact of a timing roller is released after the adhesion of an edge of a sheet to a transfer drum and before the transfer. This arrangement suppresses the influence of a slight displacement in a direction in which a sheet is conveyed by the timing roller, thus reducing color misregister in multiple transfer.

The former image forming apparatus is capable of suppressing the color misregister caused by the eccentricity of a drum or the like; however, the apparatus is incapable of dealing with the color misregister in multiple transfer caused by the discrepancy between the sheet-conveying speed of a timing roller for conveying a sheet to the transfer drum and the peripheral speed of the transfer drum in the case that the sheet-conveying speed of the timing roller changes because of abrasion of the timing roller or the like, i.e. the faulty synchronization between the sheet-conveying speed of the timing roller and the peripheral speed of the transfer drum.

In the case that there is the faulty synchronization between the sheet-conveying speed of the timing roller and the peripheral speed of the transfer drum, the feed of a sheet having a length L2 larger than the distance L1 from the timing roller to the position for transfer leads to an unstable sheet-conveying speed while the sheet stretches over both the timing roller and the transfer drum because the sheet-conveying speed of the timing roller and the rotational peripheral speed of the transfer drum are not synchronized. More specifically, the transfer of a cyan pattern, i.e. a pattern of the first color, is influenced by the conveying speed of the timing roller. The influence lasts until the trailing edge of the sheet is released from the timing roller. That is, the area of the sheet extending by the dimension (L2–L1) in length from the leading edge of the sheet is influenced by the conveying speed of the timing roller. After that, magenta, yellow, and black images are transferred sequentially and cyclically onto the sheet wound around the transfer drum without being influenced by the conveying speed of the timing roller. In the leading area of the sheet extending by the dimension (L2–L1) in length, accordingly, a color misregister will occur between the pattern of cyan which is the first color, and the magenta, yellow, and black patterns transferred subsequently.

When a thick sheet or the like is conveyed in the latter image forming apparatus, a short distance between the position for adhesion and the position for transfer would cause the press-contact of the timing roller to be released before the sheet sufficiently adheres to the transfer drum. As a result, there is a possibility that a slip would occur between the transfer drum and the sheet before the sheet reaches the transfer position and would cause a color misregister in multiple transfer.

Such a problem is pertinent to all the cases in which two or more images are sequentially transferred and superimposed onto a sheet wound around a sheet support. In these cases, each image does not have to have a different color. That is, the scope of the problem is not limited to color misregister but broadly extends over print dot misregister in multiple transfer on the whole.

SUMMARY OF THE INVENTION

The present invention is intended to provide an image forming apparatus which can readily correct print dot misregister in multiple transfer due to a change in conveying speed resulting from abrasion in a conveying roller for conveying a sheet to a sheet support, or the like.

In order to achieve the above-mentioned object, the image forming apparatus in accordance with the present invention comprises an image forming unit which sequentially forms a plurality of images and superimposes the images on a sheet, a sheet conveyor means which conveys a sheet to the image forming unit, and a controller which commands the image forming unit to form a reference pattern and controls a sheet conveying speed of the sheet conveyor in accordance with a quantity of image misregister detected in the reference pattern.

With the above arrangement, a sheet-feeding speed is calculated from the quantity of image misregister in the reference patterns formed on the sheet. The image misregister in multiple transfer is corrected by switching over the sheet-conveying speed of the sheet conveyor into an optimum feeding speed in accordance with the calculated value.

As reference patterns for detecting image misregister, it is preferable to use at least two sets of reference patterns formed on a sheet and arranged in the sheet-feeding direction, so that the accuracy of detecting the quantity of image misregister is improved. It is also preferable to switch over the rotational speed of the sheet conveyor in response to the thickness of a sheet. The switching suppresses the image misregister resulting from the mismatch between the sheet-conveying speed of the sheet conveyor and the peripheral speed of a sheet on a sheet support caused by the difference in the thickness of sheet.

BRIEF DESCRIPTION OF THE DRAWINGS

This and other objects and features of the present invention will become apparent from the following description with reference to the accompanying drawings, in which:

FIG. 1 is a grammatical inner view illustrating a full-color copying machine as an embodiment of the invention;

FIG. 6 is a plan view illustrating an example of reference patterns for detecting image misregister;

FIG. 12 is a plan view illustrating another example of reference patterns for detecting image misregister;

DETAILED DESCRIPTION OF THE PREFERRED EMBODIMENTS

Figure 2:
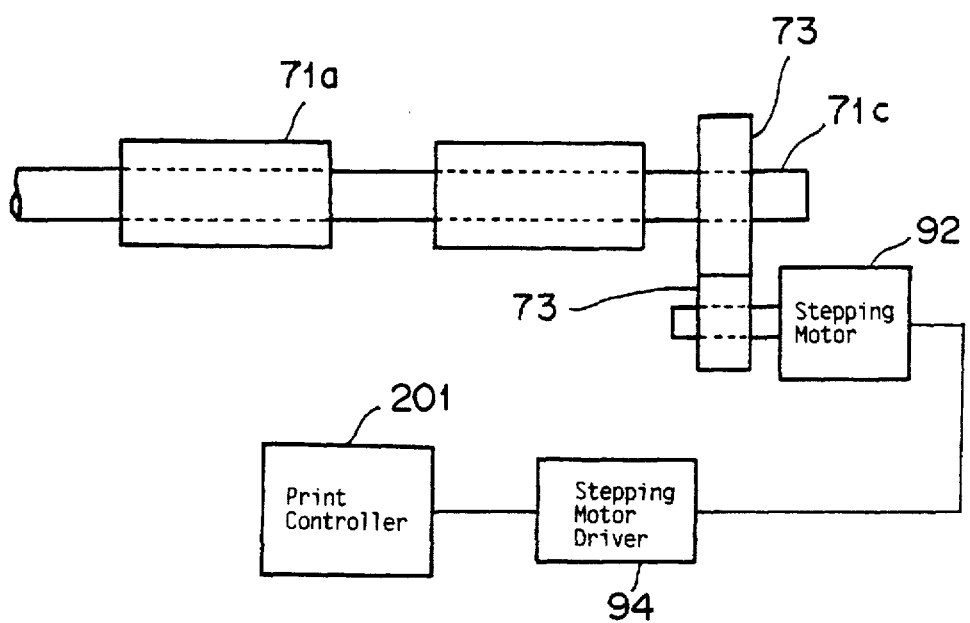
FIG. 2 is a block diagram illustrating the drive control of the timing rollers of the copying machine shown in FIG. 1.

The description of preferred embodiments according to the present invention is given below, referring to the accompanying drawings.
(Structure of Copying Machine)

FIG. 1 illustrates the general structure of a digital type full-color copying machine. The copying machine generally comprises an image reader unit 1, a laser scanning unit 10, a full-color image forming unit 20, and a paper feeding part 50.

The image reader unit 1 comprises scanners 2a, 2b for reading the image of an original document set on a platen glass 9, and an image signal processing unit 6 for processing and converting the read image data into data for printing. In the image reader unit 1, which is of a well-known type equipped with a condensed-type color image sensor (CCD) 3, the scanners 2a, 2b are driven by a motor 5 and moved in the direction of the arrow a, and thus the image sensor 3 reads the image of the original document on a line-by-line basis as color signals of the three primary colors, i.e. R (red), G (green) and B (blue). The image signal processing unit 6 converts the multiple-valued electric signals which was converted photoelectrically in the image sensor 3 into 8-bit print data corresponding to four colors of Y (yellow), M (Magenta), C (cyan) and Bk (black), performs a necessary editing process on the data, and transfers the data to the laser scanning unit 10.

The laser scanning unit 10 is of a well-known type which modulates a laser diode to sequentially and cyclically form electrostatic latent images one color at a time on a photoconductive drum 21 rotating in the direction of the arrow b and thus forms electrostatic latent images for all the colors. The laser scanning unit 10 performs a correction of gradation on the print data inputted from the image signal processing unit 6 in response to the gradation characteristic of the photoconductor, and then generates a laser diode driving signal with D/A conversion. Based on the driving signal, the laser scanning unit 10 modulates the laser diode, and thereby forms electrostatic latent images of cyan, magenta, yellow and black in that order on the photoconductive drum 21.

The full-color image forming unit 20 is constructed mainly of the photoconductive drum 21 and a transfer drum 31. Around the photoconductive drum 21 are provided an electrostatic charger 22, a developing unit 40 of a magnetic brush type, a residual toner cleaner 23 and an eraser lamp 24 for erasing residual electric charge. The developing unit 40 comprises developing devices 41C, 41M, 41Y and 41Bk each accommodating developer which contains cyan, magenta, yellow and black toner, respectively. Each time an electrostatic latent image for one of the colors is formed on the photoconductive drum 21, the corresponding developing device is driven.

The transfer drum 31 for supporting a sheet, in which dielectric film is spread and stuck around a frame in a cylindrical shape, is provided so that the drum 31 can be driven and rotated in the direction of the arrow c at the same speed as the photoconductive drum 21. A toner image is transferred onto a sheet wound around the surface of the transfer drum 31. The transfer drum 31 is provided with a pawl member (not shown) for chucking an edge of a sheet and a pawl member 33 for separating the sheet. Inside and outside the transfer drum 31 are disposed a transfer charger 34 and a transfer back-up member 38, a sheet adhesion charger 35 and an adhesion back-up member 39, a sheet separation charger 36, erasing chargers 37, and a sheet adhesion roller 72 facing the sheet adhesion charger 35.

Timing rollers 71 disposed in the vicinity of the transfer drum 31 comprise rollers 71a, 71b. As shown in FIG. 2, the timing driving rollers 71a comprise rubber members fixed onto a shaft 71c, which is driven and rotated by a stepping motor 92 via drive gears 73. The number of revolutions of the stepping motor 92 is controlled via a stepping motor driver 94 by control signal delivered from a printer controller 201, which will be described later. The timing driven roller 71b paired with the timing driving roller 71a are made of resin and are in press-contact with the timing driving roller 71a.

The paper feeding section 50 comprises a stack of three paper-feeding trays 51, 52 and 53, and sheets are fed one by one from one of the trays 51, 52 and 53 selected by the operator. The fed sheet is conveyed along a conveyor path 54 and delivered onto the transfer drum 31 by the timing rollers 71 in synchronization with the position for adhesion, and then the sheet electrostatically adheres to and is wound around the transfer drum 31 by the pressure of the sheet adhesion roller 72 and by an electric discharge from the adhesion charger 35.

In the formation of a full-color image, cyan, magenta, yellow and black images are sequentially formed on the photoconductive drum 21 so that the images having their respective colors register with one another when transferred. The toner images are then sequentially transferred onto the sheet wound around the transfer drum 31 by an electric discharge from the transfer charger 34, and thus, the images are superimposed.

More specifically, an electrostatic latent image of cyan is formed on the photoconductive drum 21 by a light emission of the modulated laser diode, and then developed by the developing device 41C for cyan. The toner image of cyan is transferred onto the sheet which has been delivered onto the transfer drum 31 by the timing rollers 71, by an electric discharge from the transfer charger 34. The sheet onto which the cyan image has been transferred then makes one revolution together with the transfer drum 31, while remaining wound around the transfer drum 31, to be ready for the transfer of a magenta image. In the meantime, an electrostatic latent image of magenta is formed on the photoconductive drum 21 by a light emission of the modulated laser diode, and then developed by the developing device 41M for magenta. The toner image of magenta is transferred onto the sheet which has made one revolution in the state of being wound around the transfer drum 31, by an electric discharge from the transfer charger 34 so that the magenta image registers with the cyan image which has already been transferred onto the sheet. In the same manner, the transfer drum 31 further makes two revolutions to allow the toner images of yellow and black to be transferred sequentially onto the sheet.

After the formation of an image having the four colors, the pawl member 33 operates to separate the sheet from the transfer drum 31. The separated sheet is delivered into a fixing device 56 by a conveyor belt 55, and the toner is fixed onto the sheet in the fixing device 56. Consequently, the sheet is discharged onto a tray 58 by discharge rollers 57.

(Control Mechanism of Copier)

Figure 3:
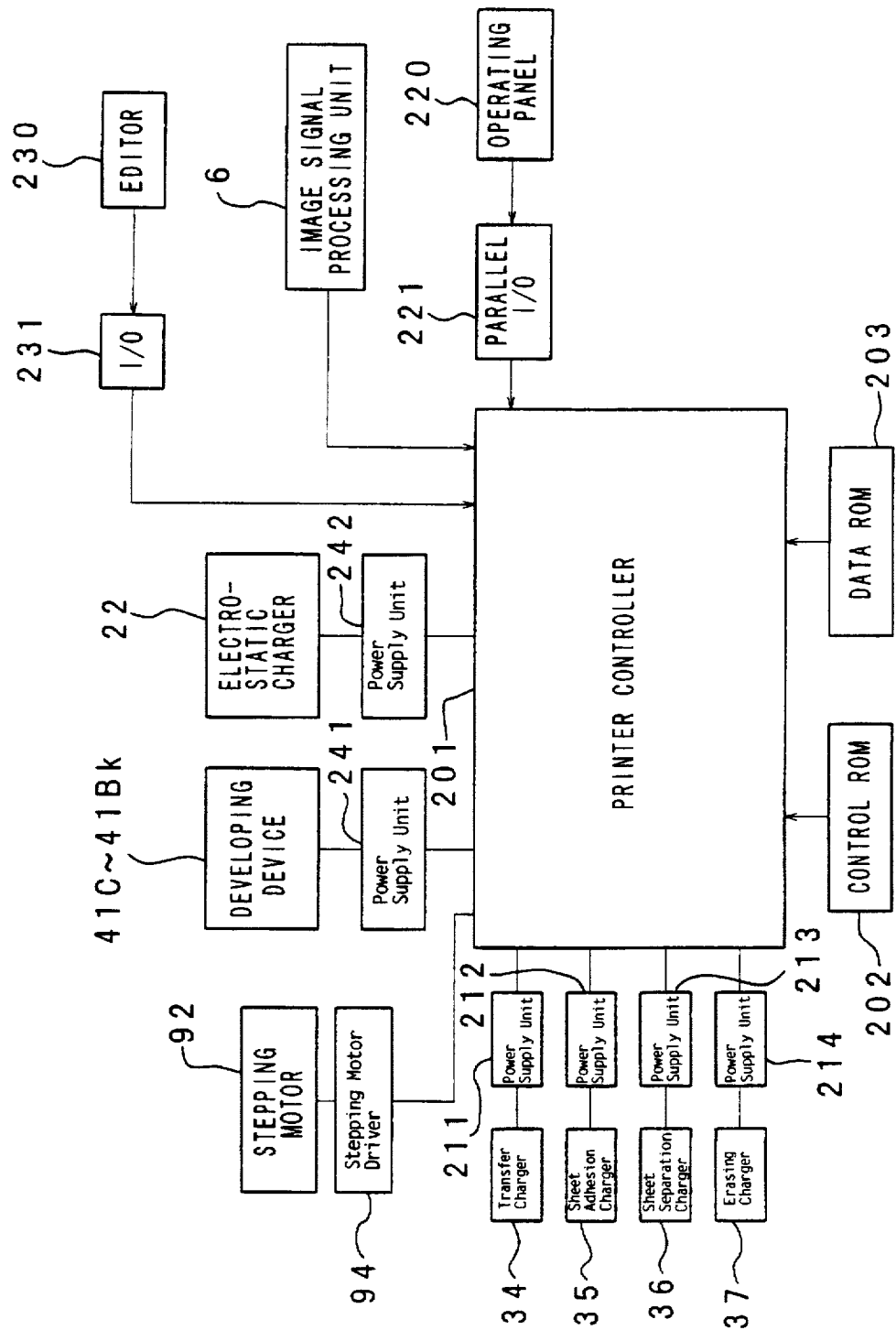
FIG. 3 is a block diagram illustrating the control circuit of the copying machine shown in FIG. 1.

FIG. 3 illustrates the general control circuit of the copying machine, which is constituted mainly of a printer controller 201. The printer controller 201 comprises a ROM 202 storing control programs and a ROM 203 storing various data.

A copy mode signal set by the operator is inputted into the printer controller 201 through a parallel I/O 221 from an operating panel 220 to control a power-supply unit 211 for the transfer charger 34, a power-supply unit 212 for the sheet adhesion charger 35, a power-supply unit 213 for the sheet separation charger 36 and a power-supply unit 214 for the erasing charger 37, based on various data inputted from the data ROM 203 and according to the contents of the control ROM 202. The printer controller 201 also controls a power-supply unit 242 for the grid voltage for the electrostatic charger 22 and a power-supply unit 241 for the developing bias for the developing devices 41C–41Bk in order to control the image gradation set by the operator with the operating panel 220.

Furthermore, the printer controller 201 is connected to the image signal processing unit 6 through a bus to perform a gamma correction on the print data sent therefrom by referring to a gamma correction table stored in the data ROM 203. The printer controller 201 is also connected to an editor 230 through an I/O 231.

(Mechanism of the Occurrence of Color Misregister)

Figure 4:
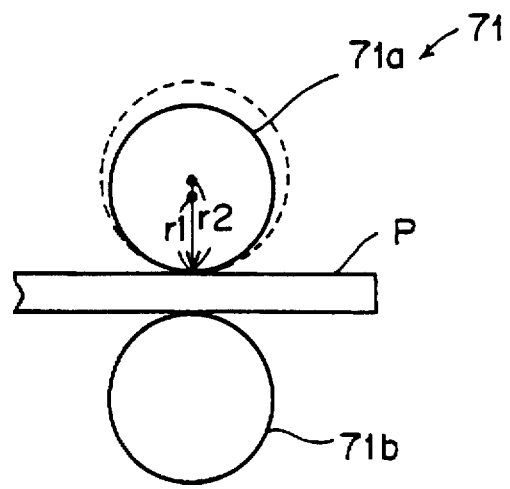
FIG. 4 is a schematic diagram illustrating a principle of the occurrence of image misregister.

In the case that, for example, dual-side full-color copying is performed in the image forming apparatus with the above arrangement, a mold release agent on a fuser roller and the like might adhere onto a toner surface of a sheet when an image is formed on one surface of the sheet. In this case, forming an image on the other surface of the sheet causes the mold release agent to adhere onto the timing driving roller 71a, which in turn absorbs the agent. Then, the timing driving roller 71a swells and increases its roller radius r1 to r2, as shown in FIG. 4. Accordingly, the sheet-conveying speed of the timing rollers 71 then exceeds the rotational peripheral speed of the transfer drum 31.

Figure 5:
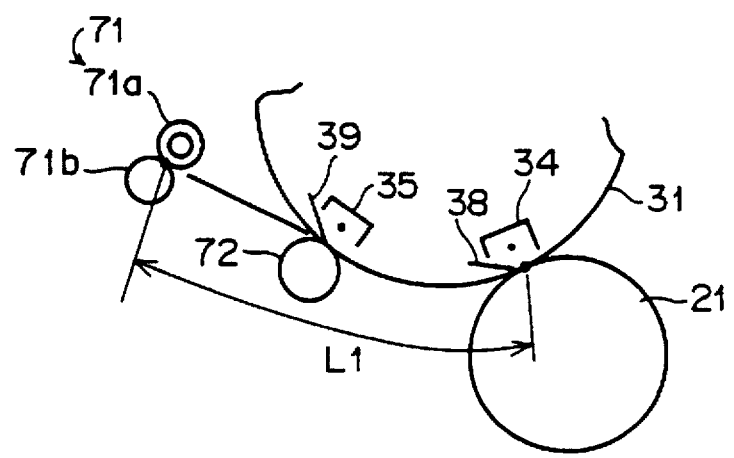
FIG. 5 is another schematic diagram illustrating the principle of the occurrence of image misregister.

In such a case, as shown in FIG. 5, feeding a sheet having a length L2 longer than the distance L1 from the timing rollers 71 to the transfer position provides an unstable sheet-conveying speed while the sheet stretches over both the timing rollers 71 and the transfer drum 31 because the sheet-conveying speed of the timing rollers 71 and the rotational peripheral speed of the transfer drum 31 are not synchronized. More specifically, the transfer of a cyan pattern, i.e. a pattern of the first color, is influenced by the conveying speed of the timing rollers 71. The influence lasts until the trailing edge of the sheet is released from the timing rollers 71. That is, the area of the sheet extending by the dimension (L2–L1) in length from its leading edge is influenced by the conveying speed of the timing rollers 71. After that, magenta, yellow and black images are transferred sequentially and cyclically onto the sheet wound around the transfer drum 31 without being influenced by the conveying speed of the timing rollers 71. In the leading area of the sheet extending by the dimension (L2–L1), accordingly, color misregister will occur between the pattern of cyan, the first color, and the magenta, yellow, and black patterns transferred subsequently. Providing L1 of 150 mm and the feed of an A3-size sheet in portrait orientation, specifically, color misregister will occur in the area of the sheet extending by 270 mm (420–150 mm) in length from its leading edge.

In another case, abrasion in the timing driving roller 71a, which decreases the radius of the roller, might cause a color misregister because the sheet-conveying speed of the timing rollers 71a, 71b would get slower than the rotational peripheral speed of the transfer drum 31.

(Detection and Correction Control of Color Misregister)

Hereinafter, the detection and correction control of color misregister will be described.

In the case that the sheet-conveying speed has a constant speed difference relative to the rotational peripheral speed of the transfer drum 31, the quantity of a color misregister will be at the maximum in the transfer position when the trailing edge of a sheet is positioned at the timing rollers 71. After that, the release of the sheet from the timing rollers 71 will allow the sheet to revolve in synchronization with the transfer drum 31, thereby decreasing the quantity of the color misregister. The embodiment has improved the accuracy of the detection of color misregister by employing a large A3-size sheet as the sheet on which reference patterns for detecting color misregister are formed, so that the state of color misregister can be clearly recognized.

The reference patterns for detecting color misregister comprise a set of at least two lines one of which is formed of a cyan pattern to be transferred as the first color and to be influenced by the conveyance of sheet and the other of which is formed of a magenta, yellow or black pattern to be transferred subsequently. In the embodiment, as shown in FIG. 6, the reference patterns comprise four sets of two lines, i.e. cyan patterns C1–C4 and magenta patterns M1–M4, which are positioned at four points p1, p2, p3 and p4, respectively, at generally uniform intervals in the sheet-feeding direction. That is, the patterns are positioned alternately in the sheet-feeding direction with the timings for writing the lines of the magenta patterns M1–M4 delayed by a certain period of time relative to the cyan patterns C1–C4, respectively. A sufficient amount of intervals are provided between the cyan patterns and the magenta patterns because overlap of the cyan patterns and the magenta patterns makes it difficult to detect the quantity of color misregister.

Figure 7:
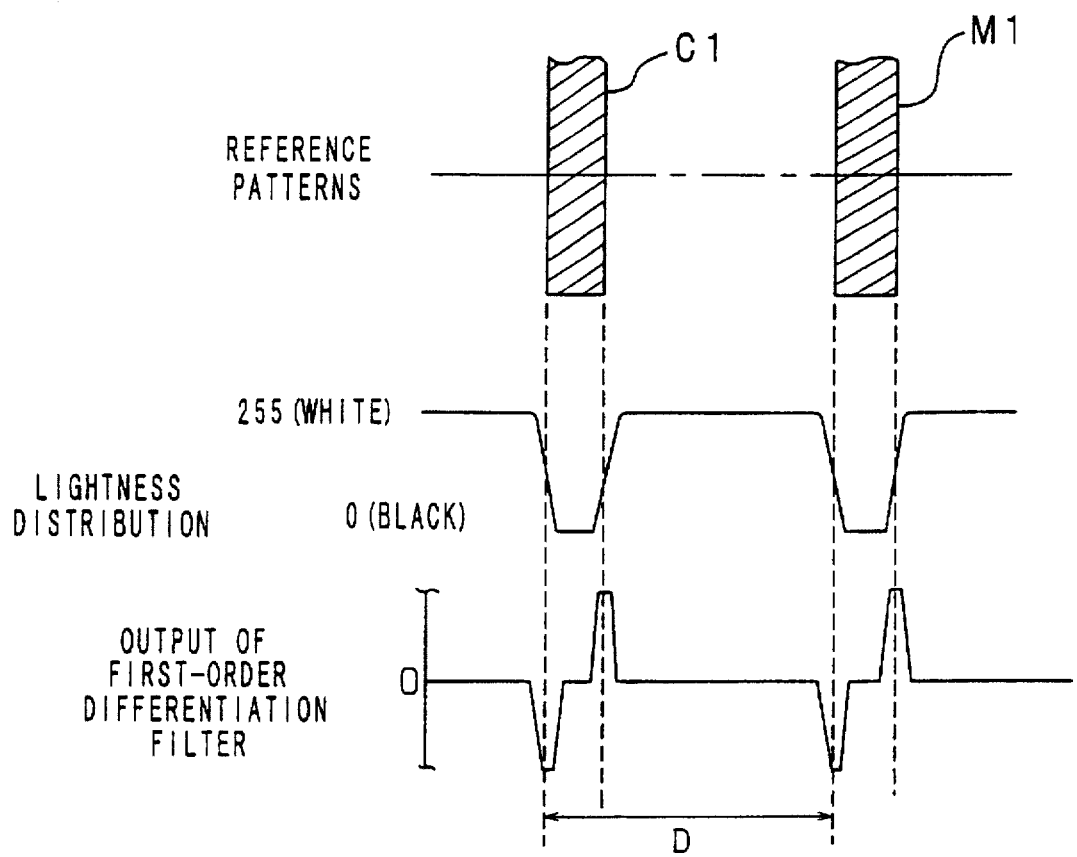
FIG. 7 is a schematic diagram illustrating the detection of the quantity of image misregister.

The reference patterns for detecting color misregister are formed on the sheet in accordance with a flowchart for producing reference patterns, which will be described in detail below. The sheet on which the reference patterns have been formed is placed on the platen glass 9 of the image reader unit 1, and then exposed to light and scanned with the scanners 2. The reflected light from the reference patterns is detected by the color image sensor 3 and inputted into the image signal processing unit 6 as a lightness distribution, as shown in FIG. 7. The image signal processing unit 6 recognizes edge portions of a line image by putting the lightness distribution through a first-order differentiation filter, and calculates the interval D between the front edge of the line image of the cyan pattern C1 and the front edge of the line image of the magenta pattern M1.

Figure 8:
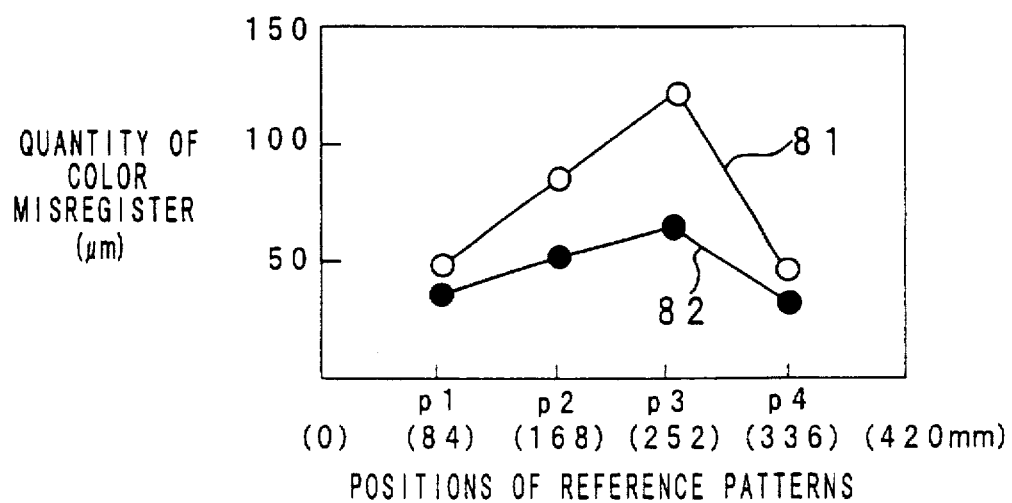
FIG. 8 is a graph illustrating an example of characteristic data on the quantity of image misregister.

When the detection of the reference patterns at the points p1–p4 is completed, there is obtained characteristic data (e.g., a solid line 81 and a solid line 82 shown in FIG. 8) on the quantity of the color misregister relative to the positions on the sheet. In the embodiment employing an A3-size sheet, the area of the sheet extending by 270 mm in length from the leading edge of the sheet is influenced by the conveying speed of the timing rollers 71 as described above.

Because the points p1–p4 are positioned on the sheet at generally uniform intervals from the leading edge of the sheet, specifically with a pitch of 84 mm, there exists an influence of the conveying speed of the timing rollers 71 at the points p1–p3 but there exists no influence of the conveying speed of the timing rollers 71 at the point p4. Therefore, whether color misregister has been caused by the influence of the conveying speed of the timing rollers 71 or by a reason other than the conveying speed of the timing rollers 71 can be judged by generally observing the characteristic obtained from the points p1–p4. Moreover, how much the rotational speed of the timing rollers 71 deviates from the rotational speed of the transfer drum 31 can also be judged with the observation.

Table 1 shows shift levels for correcting the rotational speed of the stepping motor 92 in response to various quantities of color misregister at the points p1–p4. The data in Table 1 has been previously stored in the data ROM 203. In Table 1, the sign of the quantity of color misregister is assumed to be minus in the case that the edge of a cyan pattern is farther forward than the reference position relative to the edge of the corresponding magenta pattern (or farther from the magenta pattern than the reference position is), while the sign is assumed to be plus in the case that the edge of a cyan pattern is at the rear of the reference position relative to the edge of the corresponding magenta pattern (or nearer to the magenta pattern than the reference position is).

TABLE 1

(Unit: μm)

| SPEED SHIFT LEVEL | POINT | | | |
|---|---|---|---|---|
| | p1 | p2 | p3 | p4 |
| +3 | –100~ | –150~ | –200~ | –80~ |
| +2 | –70~ | –110~ | –150~ | –60~ |
| +1 | –40~ | –70~ | –100~ | –30~ |
| ±0 | 0~±20 | 0~±40 | 0~±50 | 0~±20 |
| –1 | ~+40 | ~+70 | ~+100 | ~+30 |
| –2 | ~+70 | ~+110 | ~+150 | ~+60 |
| –3 | ~+100 | ~+150 | ~+200 | ~+80 |

The printer controller 201 determines a speed shift level based on the characteristic data on the quantity of color misregister delivered from the image signal processing unit 6 and based on the data in Table 1 stored in the data ROM 203, and controls the rotational speed of the stepping motor 92 in accordance with the speed shift level. Consequently, the rotational speed of the timing rollers 71 is adjusted and thus the color misregister is corrected. When the characteristic on the quantity of color misregister provides, for example, the solid line 81 in FIG. 8, the speed shift level "–2" will be selected; when the characteristic provides the solid line 82 in FIG. 8, the speed shift level "–1" will be selected.

Figure 9:
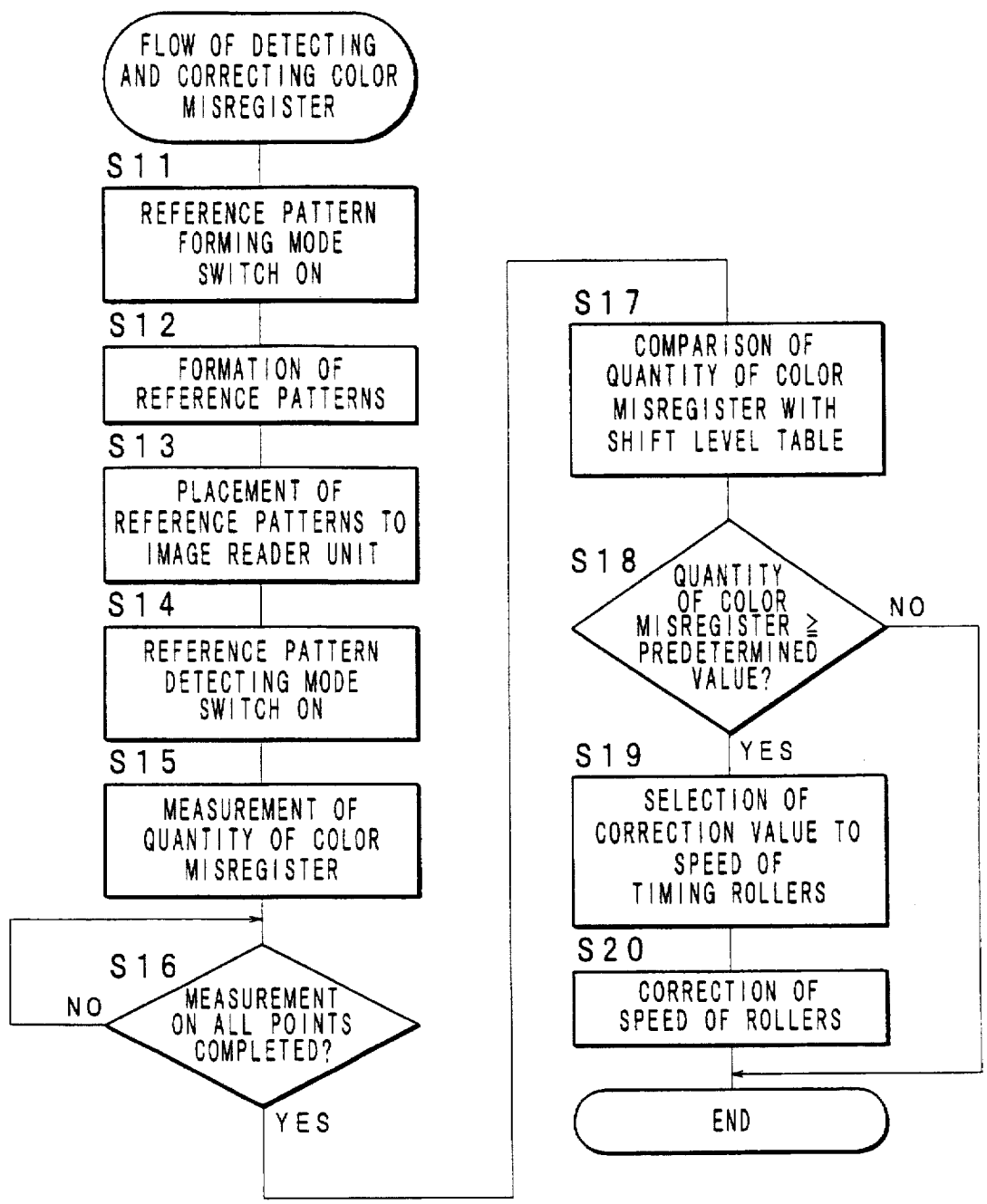
FIG. 9 is a flowchart illustrating a procedure of the detection of the quantity of image misregister and of the control of the correction of the image misregister.

The procedure of the detection and correction control of color misregister will be further described referring to the flowchart shown in FIG. 9.

In the step S11, a reference pattern forming mode switch is turned on by the operator, and predetermined reference patterns (see FIG. 6) are formed on a sheet in the step S12. In the step S13, the sheet on which the reference patterns have been formed is placed on the platen glass 9 of the image reader unit 1 so as to be in a predetermined orientation and at a predetermined position.

When a reference pattern detecting mode switch is turned on by the operator in the step S14, the reference patterns are read by the image reader unit 1, and the quantities of color misregister between the cyan patterns and the magenta patterns are measured. In the case of the judgment in the step S16 that all the points p1–p4 in the reference patterns have been measured, the results are compared with the shift level table for speed correction (see Table 1) stored in the data ROM 203, in the step S17.

Next, in the case of the judgment in the step S18 that the quantity of color misregister is not less than a predetermined value, the quantity of correction of the rotational speed of the timing rollers 71 is selected in accordance with the shift level table for speed correction in the step S19. In the step S20, the control signal corresponding to the selected quantity of correction is sent to the stepping motor driver 94 from the printer controller 201, and the procedure ends after the rotational speed of the rollers 71 is switched into an optimum speed. In the case of the Judgment in the step S18 that the quantity of color misregister is below the predetermined value, the procedure ends without correcting the rotational speed of the timing rollers 71.

Figure 10:
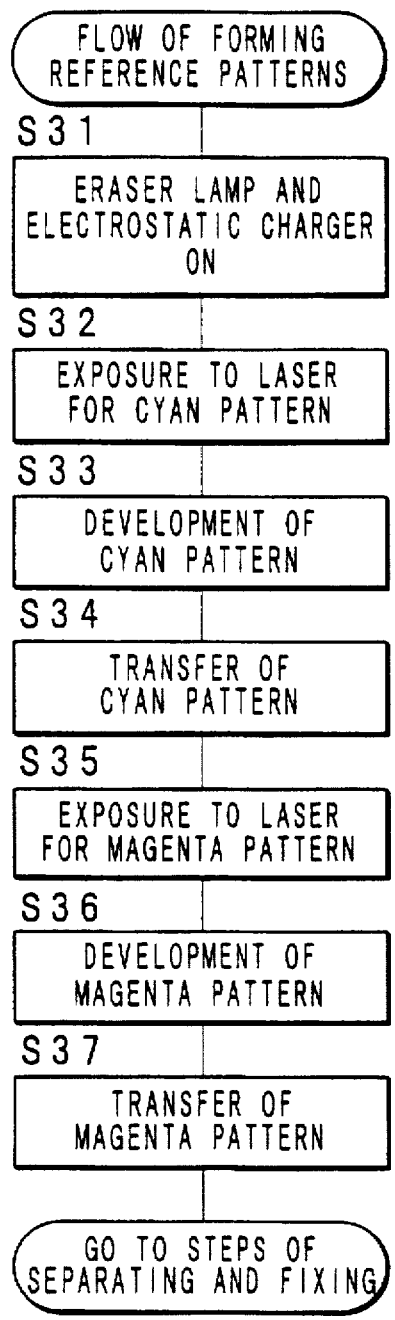
FIG. 10 is a flowchart illustrating a procedure of the formation of reference patterns for detecting image misregister.

FIG. 10 is a detailed flowchart for the reference pattern formation in the step S12 shown in FIG. 9. In the step S31, the electrostatic charger 22 and the eraser lamp 24 are turned on; and then the cyan patterns, i.e. the reference patterns of the first color, are formed with a laser on the photoconductive drum 21 as an electrostatic latent image, in the step S32. The latent image is developed into a toner image by the developing device 41C in the step S33, and then the toner image is transferred onto a sheet in the step S34. Subsequently, the magenta patterns, i.e. the reference patterns of the second color, are formed on the photoconductive drum 21 as an electrostatic latent image in the step S35.

Next, the latent image is developed into a toner image by the developing device 41M in the step S38, and the toner image is then transferred onto the sheet on which the cyan patterns have been formed, in the step S37. After the cyan patterns and the magenta patterns are sequentially formed on the sheet, the pawl member 33 operates to separate the sheet from the transfer drum 31. The separated sheet is delivered into the fixing device 56 by the conveyor belt 55, and the toner is fixed onto the sheet by the fixing device 56. After that, the sheet is discharged onto the tray 58 by the discharge rollers Additionally, the image forming apparatus of the embodiment comprises means which is capable of switching over the rotational speed of the timing rollers 71 in response to the thickness of a sheet to vary the sheet-conveying speed.

Figure 11:
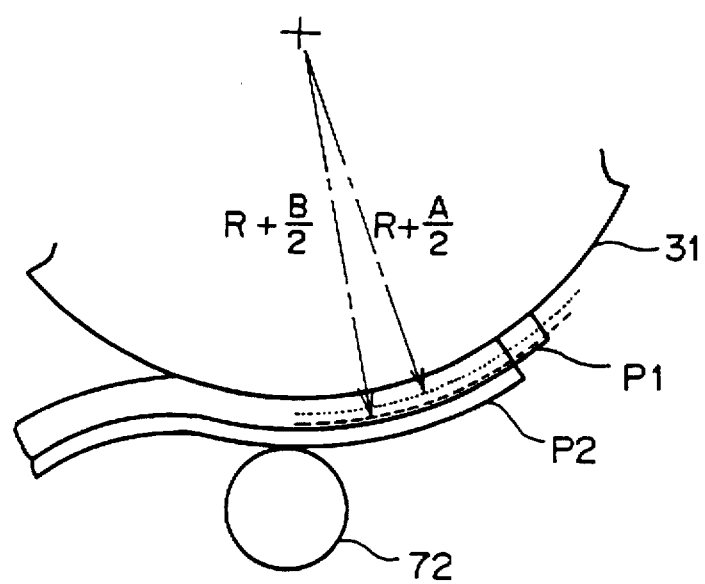
FIG. 11 is a schematic diagram illustrating the relation between the rotational peripheral speed of a transfer drum and the thickness of a sheet.

As shown in FIG. 11, the peripheral speed of a sheet on the transfer drum 31 is the multiple of the distance from the center of the transfer drum 31 to the center of the thickness of the sheet by the angular speed ω of the transfer drum 31. Specifically, providing the thickness A of a sheet P1 of plain paper, the thickness B of a sheet P2 of cardboard and the radius R of the transfer drum 31, the peripheral speeds of the sheet P1 of plain paper and of the sheet P2 of cardboard are (R+A/2)ω and (R+B/2)ω, respectively. Accordingly, feeding sheets without considering the difference in peripheral speed between the sheet P1 and the sheet P2 causes color misregister because the sheet-conveying speed of the timing rollers 71 is not synchronized with the peripheral speed of a sheet on the transfer drum 31. Therefore, the embodiment also prevents such color misregister caused by the difference in the thickness of sheet, by comprising means for switching over the rotational speed of the timing rollers 71 in response to the peripheral speeds of the sheets P1 and P2.

A method of switching over the rotational speed of the timing rollers 71 in response to the thickness of a sheet may be a key entry on the operating panel by the operator. Alternatively, the rotational speed may be automatically switched over by detecting the thickness of a sheet with a sensor provided in the vicinity of the sheet-conveyor path 54. The data in Table 1 is a shift level table on motor speed for plain paper; however, the data ROM 203 is also stored with a shift level table on motor speed for cardboard.

As clearly seen from the above description, print dot misregister in multiple transferring can be readily suppressed by detecting the quantity of print dot misregister of the reference patterns formed on a sheet and by correcting the rotational speed of the timing rollers 71 which convey a sheet to the transfer drum 31. Additionally, the embodiment, in which the press-contact of the timing rollers 71 need not be released, will not cause any slip between the transfer drum 31 and a sheet even in the case of conveying a thick sheet, and thus will not cause any print dot misregister resulting from such a slip.

The accuracy of detecting the quantity of print dot misregister can be improved by employing at least two sets of reference patterns formed on a sheet and arranged in the sheet-feeding direction. Besides, any print dot misregister resulting from the difference in the thickness of a sheet can also be suppressed by switching over the rotational speed of the timing rollers 71 in response to the thickness of a sheet.
(Other Embodiments)

The reference patterns for detecting color misregister can be provided at arbitrary positions: for example as shown in FIG. 12, the reference patterns can be arranged in rows in the sheet-feeding direction by forming cyan patterns C1–C4 in the right-hand part of a sheet P and magenta patterns M1–M4 in the left-hand side of the sheet P.

Figure 13:
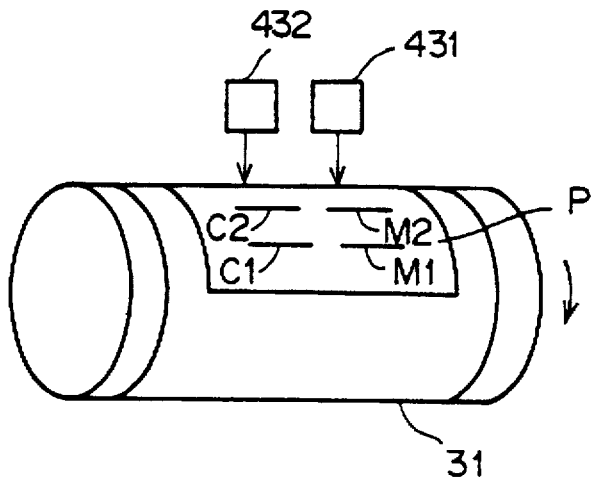
FIG. 13 is a perspective view illustrating another method of detecting the quantity of image misregister.

In the detection of the quantity of color misregister, as shown in FIG. 13, the positions of reference patterns may be detected with sensors 431, 432, which have been provided around the transfer drum 31, with a sheet P on which the reference patterns have been formed adhering onto the transfer drum 31.

Figure 14:
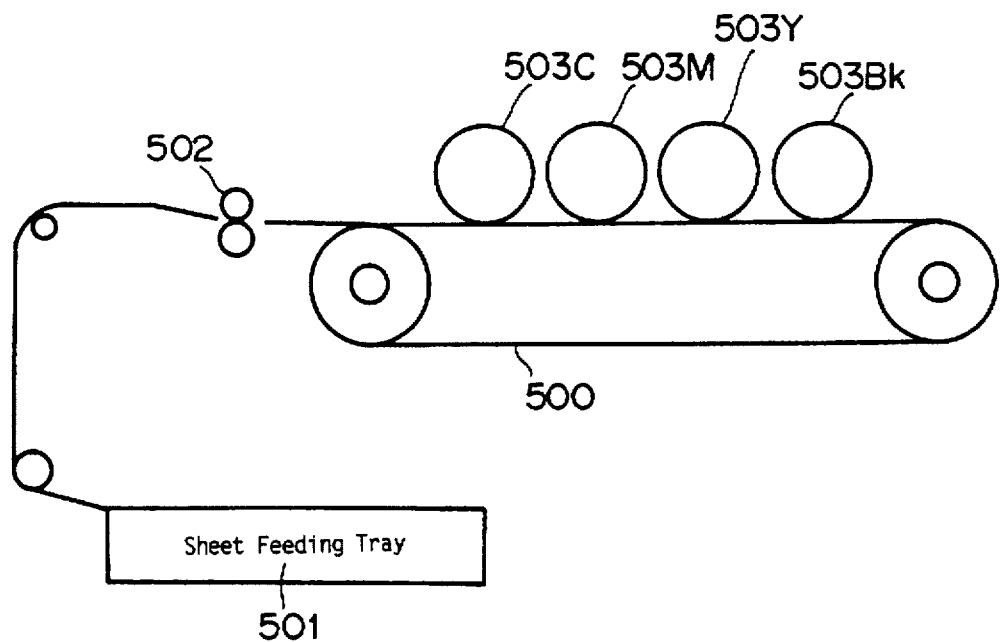
FIG. 14 is a grammatical view illustrating another full-color copying machine.

The invention can be effectively applied to an image forming apparatus of a tandem type in which photoconductors 503C, 503M, 503Y and 503Bk for cyan, magenta, yellow and black, respectively, are arranged in a row as shown in FIG. 14 and in which the distance between a pair of timing rollers 502 and the transfer position for cyan toner image is smaller than the length of a sheet. In FIG. 14, the reference numeral 500 denotes a transfer belt and the numeral 501 denotes a sheet-feeding tray.

The aforementioned embodiments were described on full-color image forming apparatus; however, the application of the invention is not limited thereto and the invention can be effectively applied to all the cases where not less than two images are sequentially transferred and superimposed onto a sheet wound around a sheet support. In these cases, the colors of the toner images do not have to differ.

The image forming apparatus in accordance with the invention is not limited to the above embodiment, but various changes and modifications may be made without departing from the spirit and scope of the invention.

What is claimed is:

1. An image forming apparatus comprising:
    an image forming unit which sequentially forms a plurality of images and superimposes the images on a sheet;
    a sheet conveyor which conveys a sheet to the image forming unit; and
    a controller which commands the image forming unit to form a reference pattern and controls a sheet conveying speed of the sheet conveyor in accordance with a quantity of image misregister detected in the reference pattern.

2. An image forming apparatus as claimed in claim 1, wherein:
    the image forming unit sequentially forms a plurality of images of different colors; and
    the reference pattern comprises a set of a plurality of images of different colors.

3. An image forming apparatus as claimed in claim 2, wherein the set in the reference pattern comprises an image of a first color and an image of a second color which are formed in different positions with respect to a sheet conveying direction.

4. An image forming apparatus as claimed in claim 3, wherein the reference pattern comprises a plurality of sets formed in different positions with respect to the sheet conveying direction.

5. An image forming apparatus as claimed in claim 1, wherein:
    the image forming unit forms a plurality of images by carrying out a first process and a plurality of subsequent processes different from the first process; and
    the reference pattern comprises a set of a first image formed in the first process and a second image formed in at least one of the subsequent processes.

6. An image forming apparatus as claimed in claim 5, wherein the first image and the second image in the set in the reference pattern are formed in different positions with respect to a sheet conveying direction.

7. An image forming apparatus as claimed in claim 6, wherein the reference pattern comprises a plurality of sets formed in different positions with respect to the sheet conveying direction.

8. An image forming apparatus as claimed in claim 1, further comprising an image reader which reads the reference pattern and detects the quantity of misregister of images.

9. An image forming apparatus comprising:
    a sheet conveyor which conveys a sheet;
    an image forming unit which forms a first image on the sheet conveyed from the sheet conveyor while receiving the sheet and forms and superimposes a second image on the first image while further conveying the sheet; and
    a controller which commands the image forming unit to form a reference pattern to detect a quantity of image misregister between the first image and the second image caused by a difference between a sheet conveying speed of the sheet conveyor and that of the image forming unit and controls the sheet conveying speed of the sheet conveyor in accordance with the quantity of image misregister detected in the reference pattern.

10. An image forming apparatus as claimed in claim 9, wherein the image forming unit has a recirculating mechanism which conveys a sheet received from the sheet conveyor to an image forming position repeatedly.

11. An image forming apparatus as claimed in claim 10, wherein the image forming unit forms images of different colors in respective cycles of the recirculating mechanism, thereby making the first image and the second image have different colors.

12. An image forming apparatus as claimed in claim 9, wherein the image forming unit has a plurality of image forming stations and a sheet transporter which transports a sheet between the image forming stations.

13. An image forming apparatus as claimed in claim 12, wherein images of different colors are formed at the respective image forming stations, thereby making the first image and the second image have different colors.

14. An image forming apparatus as claimed in claim 9, wherein the reference pattern comprises a set of a plurality of images of different colors.

15. An image forming apparatus as claimed in claim 14, wherein the set in the reference pattern comprises an image of a first color and an image of a second color which are formed in different positions with respect to a sheet conveying direction.

16. An image forming apparatus as claimed in claim 15, wherein the reference pattern comprises a plurality of sets formed in different positions with respect to the sheet conveying direction.

17. An image forming method comprising:

a sheet conveying step of conveying a sheet to an image forming unit;

a first image forming step of forming a first test image in a first image forming process on the sheet conveyed in the sheet conveying step;

a second image forming step of forming a second test image in a second image forming process on the sheet which has obtained the first test image;

a detecting step of detecting a quantity of image misregister between the first test image and the second test image;

a determining step of determining a sheet conveying speed to correct the image misregister in accordance with the quantity of image misregister detected in the detecting step; and a printing step of conveying a sheet to the image forming unit at the speed determined in the determining step and forming a print image in the first and second image forming processes.

18. An image forming method as claimed in claim 17, wherein images of different colors are formed in the first image forming process and in the second image forming process, respectively.

* * * * *